H. STAHL.
TIRE INFLATING DEVICE.
APPLICATION FILED MAR. 6, 1913.
1,115,122.  Patented Oct. 27, 1914.
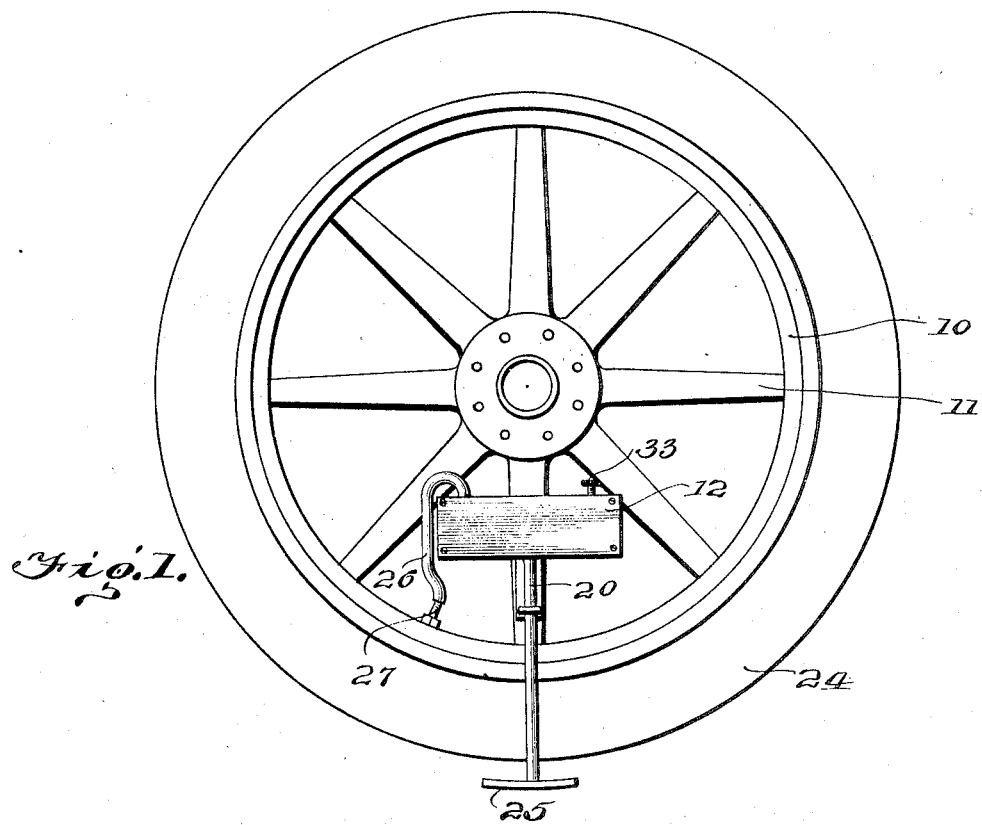
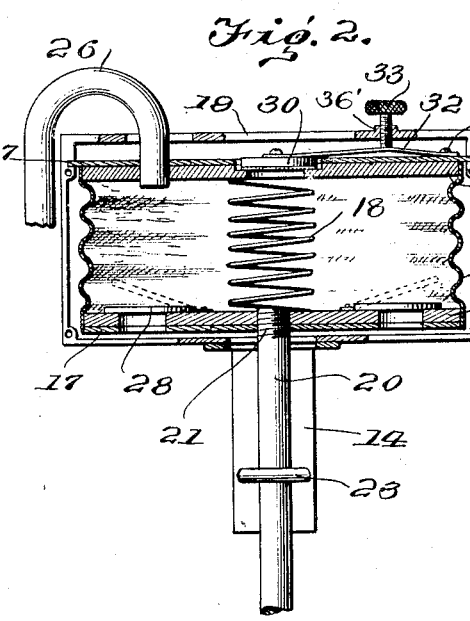
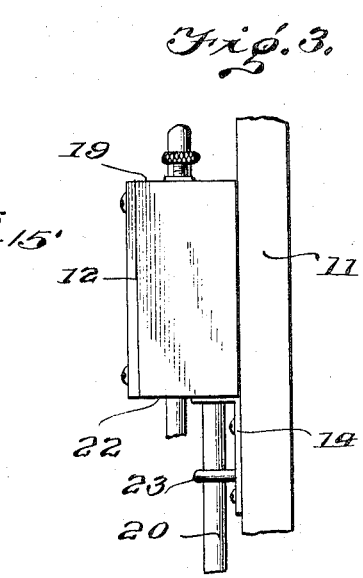

UNITED STATES PATENT OFFICE.

HERMAN STAHL, OF ERIE, PENNSYLVANIA.

TIRE-INFLATING DEVICE.

1,115,122.  Specification of Letters Patent.  Patented Oct. 27, 1914.

Application filed March 6, 1913. Serial No. 752,526.

*To all whom it may concern:*

Be it known that I, HERMAN STAHL, citizen of the United States, residing at Erie, in the county of Erie and State of Pennsylvania, have invented certain new and useful Improvements in Tire-Inflating Devices, of which the following is a specification.

This invention relates to an improvement in tire inflating devices.

The primary object of the invention is to provide a device supported by a pneumatic tired wheel which, when the wheel is in motion, will constantly supply air to the tire.

Another object of the invention is to provide a construction in which the air in the tire may be maintained at a predetermined pressure, that is, the constant supply of air may not rise above a certain pressure which would tend to burst the tube.

A still further object of the invention is to provide a construction which may be supported on the spokes of a wheel and which, while forming an effective pump, will not interfere with the movement of the wheel, or itself be disarranged by said movement.

For a full understanding of the invention, reference is to be had to the following description and accompanying drawing, in which:

Figure 1 is an elevation showing the device arranged on a pneumatic tired wheel; Fig. 2 is a sectional view of the casing which houses the pump; and Fig. 3 is an end elevation of the device.

Corresponding and like parts are referred to in the following description and indicated in all the views of the drawing by the same reference characters.

In the drawing, 10 designates the wheel which is of the usual construction, being provided with spokes 11. A casing 12 is secured to one of the spokes, said casing being preferably rectangular and constructed of metal.

The rear wall 13 of the casing is provided with an extension 14, the casing being bolted or secured by means of brackets to the spoke 11. A plurality of spaced diaphragms 15 and 16 are arranged within the casing, said diaphragms being constructed of wood, a metallic plate 17 being arranged on the outer faces of the same. A coiled spring 18 normally spaces these diaphragms, the coiled spring being disposed centrally of the same.

The upper diaphragm is secured to the top plate 19 of the casing, one of the terminal convolutions of the spring 18 being secured to the inner face of the diaphragm 16. A flexible cylindrical member 15', preferably constructed of leather, is secured to each of the diaphragms, the members embracing and being secured to the edges of the same. A plunger rod 20 is secured to the lower diaphragm, said plunger rod extending through an opening 21 formed in the lower plate 22 of the casing. This plunger rod passes through the guide 23 which is supported by the plate 14, the rod projecting beyond the tire 24, being provided at its terminal with a longitudinally curved plate 25 which extends over the tire.

When the wheel rotates to bring the plate 25 in contact with the ground, the pressure on the rod 20 will move the diaphragm 15 against the tension of the spring 18, it being understood that when the diaphragms are spaced by the spring, as shown in Fig. 2, the plate 25 will be spaced from the tire. Thus, the periodical contact of the plate 25 with the ground will cause the reciprocation of the rod 20 which will move the diaphragm 15 toward the diaphragm 16. The air compressed between the diaphragms by this movement passes out through the tube 26 which is connected to the valve 27 of the tire. It will be seen that the travel of the wheel will constantly supply air to the tire.

The lower diaphragm 15 is provided with a plurality of flap valves 28 which allow for the free return movement of the diaphragm which is caused by the spring 18. The upper diaphragm 16 is provided with an opening 29 in which is seated a valve 30. This valve is maintained in contact with the seat 31 by means of a spring 32. The tension of this spring may be regulated by the set-screw 33 which bears against the spring intermediate of the point 34 where it is secured to the outer face of the casing and the point where it is secured to the valve 30. The set-screw 33 is supported by a portion 36' of the frame 36 which forms a part of the casing.

It will be obvious by this construction that when the tire becomes inflated to an extent where back pressure will occur, the valve 30 will act as a safety valve, allowing the air to escape. The supply of air to the tire is thus discontinued, preventing over inflation which might result in the bursting of the tire.

The many advantages of a construction of this character will be clearly apparent, as it will be noted that the device provides an effectual means for maintaining the tire inflated without danger of over inflation.

It will also be noted that the structure is such as may be easily and economically manufactured, and that it may be readily positioned on pneumatic tired wheels without in any way altering their construction or affecting their movement.

Having thus described my invention, what I claim as new and desire to secure by Letters Patent is:

1. A tire inflating device comprising a casing supported by the spoke of a pneumatic tired wheel, a plurality of diaphragms arranged in said casing, one of the diaphragms being secured to the top of the casing, a coiled spring interposed between the diaphragms and normally maintaining the other diaphragm adjacent the base of the casing, a plunger connected to said other diaphragm and projecting through the casing, a longitudinally curved plate supported by the plunger and disposed to extend transversely of the tire, a flexible hollow member having its ends secured to the diaphragms, and a connection between the chamber formed by the diaphragms and said flexible member and the valve of the tire.

2. A tire inflating device for pneumatic tired wheels including a casing carried by the wheel, a fixed diaphragm, and a movable diaphragm, both arranged in the casing, a flexible envelop connecting the diaphragms and forming an air chamber therebetween, valves controlling the inlet and outlet of air into the air chamber, and a rod carried by the movable diaphragm and mounted for reciprocation through the wall of the casing, said rod extending radially beyond the rim of the wheel, and means for conducting air from the air chamber to the tire of the wheel.

3. The combination with a wheel having a pneumatic tire, of a tire inflating device including a casing attached to the wheel, a fixed diaphragm, and a movable diaphragm, both arranged within the casing, a flexible envelop connecting the diaphragms and forming an air chamber therebetween, a rod mounted for reciprocation through the wall of the casing and connected to the movable diaphragm, said rod extending beyond the periphery of the wheel, whereby it will engage the road once during each revolution of the wheel for periodically reciprocating the movable diaphragm, and valves controlling the inlet and outlet of air into the air chamber.

In testimony whereof I affix my signature in presence of two witnesses.

HERMAN STAHL. [L. S.]

Witnesses:
  H. H. STRICKER,
  GUSTAV STEMMER.